(12) United States Patent
Hayashi et al.

(10) Patent No.: US 8,462,886 B2
(45) Date of Patent: Jun. 11, 2013

(54) MOBILE WIRELESS TERMINAL DEVICE AND BASE STATION SEARCH METHOD

(75) Inventors: Yuki Hayashi, Ome (JP); Kengo Kurose, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/267,671

(22) Filed: Oct. 6, 2011

(65) Prior Publication Data
US 2012/0114082 A1  May 10, 2012

(30) Foreign Application Priority Data

Nov. 5, 2010  (JP) ................................ 2010-249147

(51) Int. Cl.
*H03K 9/00* (2006.01)
*H04L 27/00* (2006.01)
*H04L 27/06* (2006.01)

(52) U.S. Cl.
USPC ............ 375/316; 375/324; 375/340; 375/219

(58) Field of Classification Search
USPC ................. 375/219, 295, 296, 316, 324, 326, 375/340, 358, 371, 368, 220, 222, 240.26–240.27, 278, 341, 348; 370/241, 370/241.1, 252, 253, 251
See application file for complete search history.

(56) References Cited

U.S. PATENT DOCUMENTS

| | | | | |
|---|---|---|---|---|
| 2006/0234740 A1* | 10/2006 | Sakoda | .......................... | 455/507 |
| 2009/0092075 A1* | 4/2009 | Corson et al. | .................. | 370/328 |
| 2010/0048212 A1* | 2/2010 | Yavuz et al. | ................... | 455/436 |
| 2010/0056054 A1 | 3/2010 | Yamato et al. | | |
| 2011/0045769 A1* | 2/2011 | Yoshioka et al. | ............ | 455/41.1 |
| 2011/0051697 A1* | 3/2011 | Wang et al. | .................... | 370/336 |
| 2011/0268005 A1 | 11/2011 | Kurose et al. | | |

FOREIGN PATENT DOCUMENTS

| | | |
|---|---|---|
| JP | 05-344115 | 12/1993 |
| JP | 07-038486 | 2/1995 |
| JP | 2001-103000 | 4/2001 |
| JP | 2001-103109 | 4/2001 |
| JP | 2001-211072 | 8/2001 |
| JP | 2007-104033 | 4/2007 |
| JP | 2010-088101 | 4/2010 |
| WO | WO 2011-121807 | 6/2011 |

OTHER PUBLICATIONS

Japanese Office Action issued by JPO on Dec. 6, 2011 in the corresponding Japanese Patent Application No. 2010-249147.

* cited by examiner

*Primary Examiner* — Sam K Ahn
*Assistant Examiner* — Linda Wong
(74) *Attorney, Agent, or Firm* — Knobbe, Martens, Olsen & Bear LLP

(57) ABSTRACT

According to one embodiment, a mobile wireless terminal device includes a receiver detecting a beacon and a communication module detecting a base station identification. The receiver comprises an accumulation module accumulating levels of a sampling received wireless signal to obtain a reception profile, a correlation module detecting a shift amount maximizing a correlation between a present reception profile and a past reception profile, a first detector detecting a beacon, when a difference between the detected shift amount and a default amount is larger than a predetermined amount, in accordance with a difference between a shifted profile by the default amount, and the present reception profile, and a second detector which detects a beacon, when the difference is not larger than the predetermined amount, in accordance with a difference between a shifted profile by the detected shift amount, and the present reception profile.

11 Claims, 15 Drawing Sheets

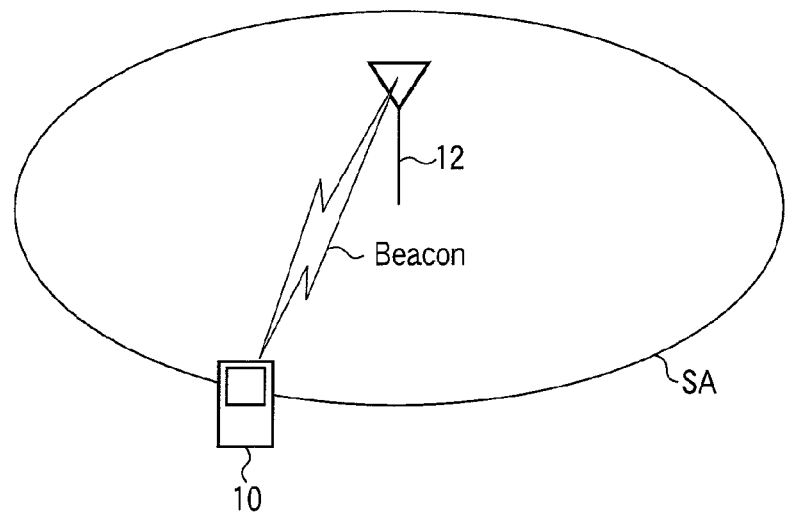
F I G. 1
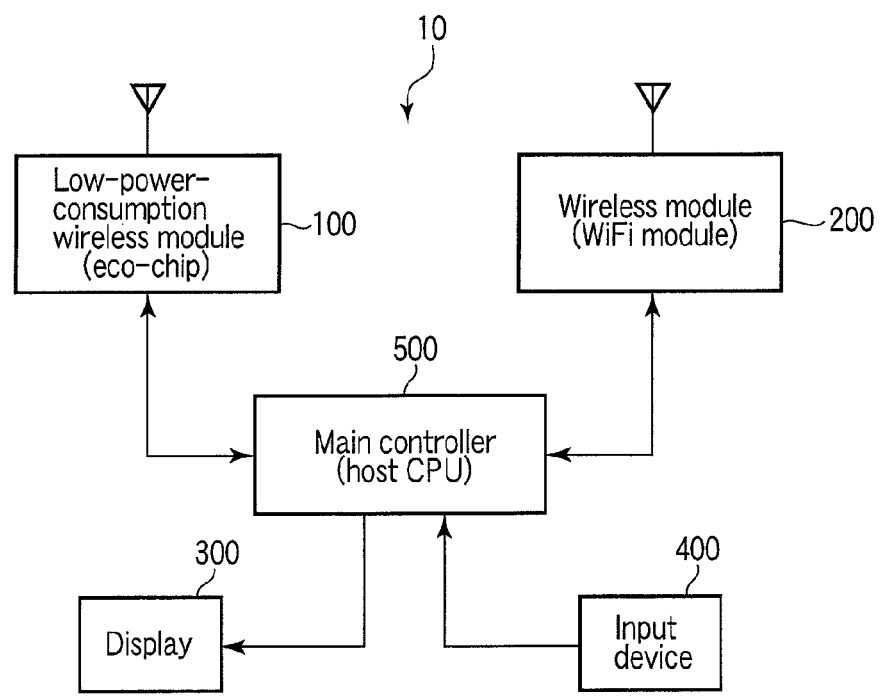
F I G. 2

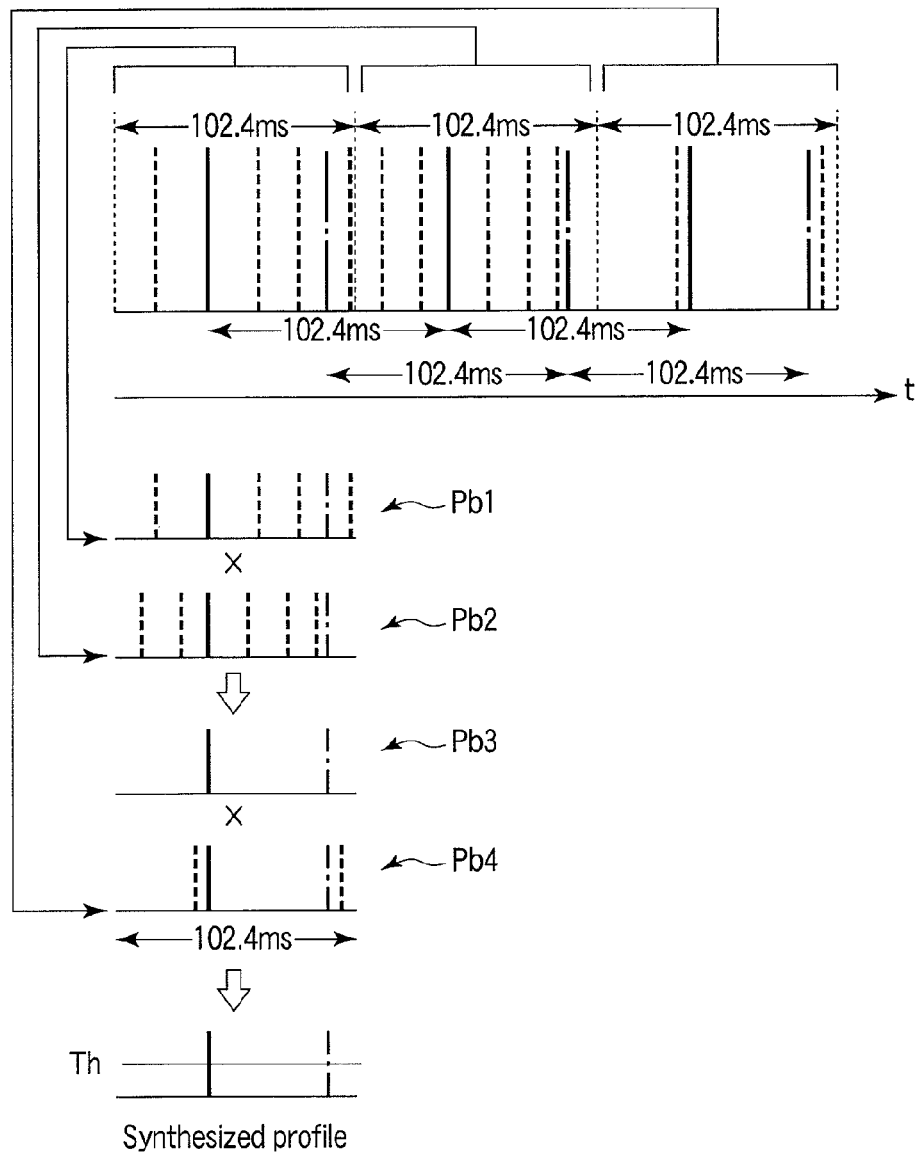
F I G. 6

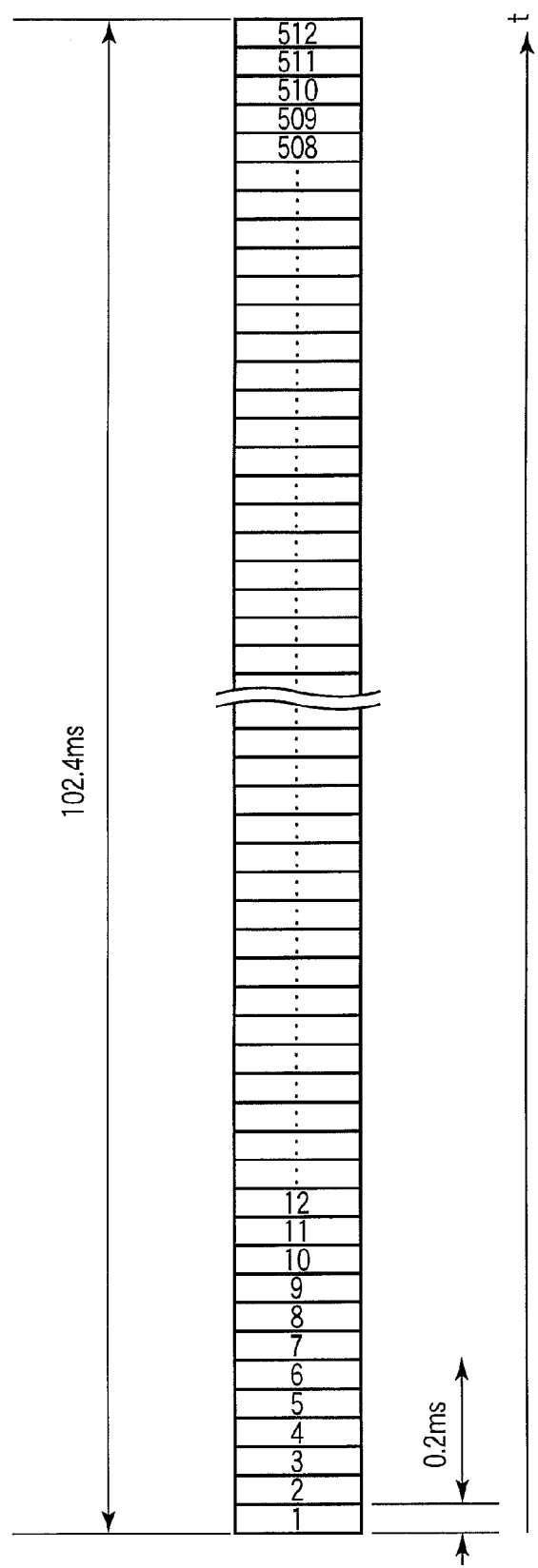
F I G. 7

| Memory name | Initialization timing name |
|---|---|
| Accumulation memory 126a | Before accumulation processing or after threshold determination processing |
| Past search result list (L1) memory 126b | At power-on time |
| Present search result list (L2) memory 126c | Before threshold determination processing or after copying, after a new beacon is detected, detection result into past search result list memory 126c |
| Disappearance time table memory 126d | At power-on time |
| Detection beacon position memory 126e | After completion of new beacon detection processing |
| Disappearance beacon position memory 126f | After completion of new beacon detection processing |
| Shadowing follow-up counter memory 126g | Before accumulation processing or after threshold determination processing |

F I G. 8

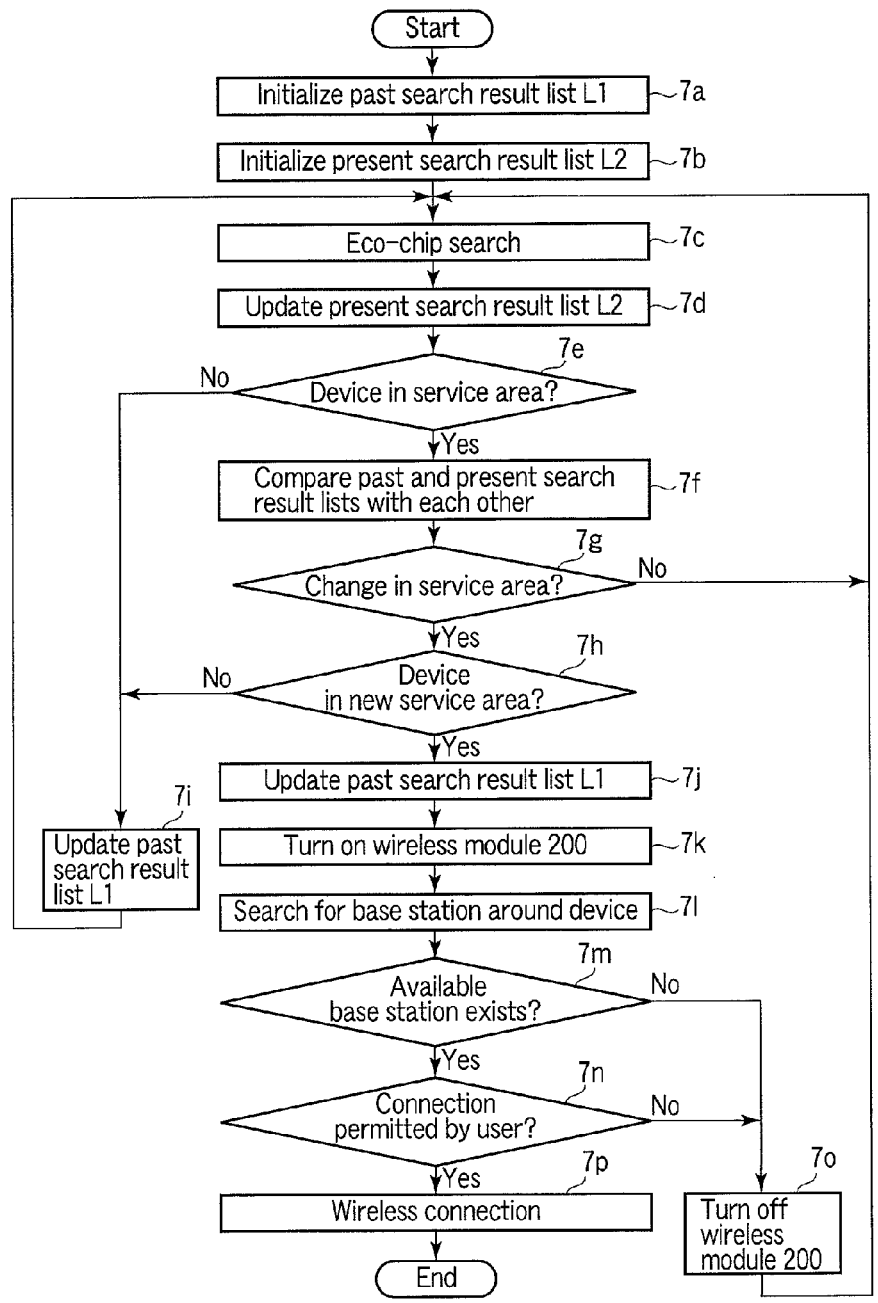
F I G. 12

Past search result list L1 (memory 126b)
| 0 | 1 | 2 | 3 | 4 | 5 | 6 | 7 | 8 | 9 | 10 | .... |
|---|---|---|---|---|---|---|---|---|---|----|------|
| 0 | 0 | 1 | 0 | 0 | 0 | 0 | 0 | 1 | 1 | 0  | .... |
F I G. 13A
Present search result list L2 (memory 126c)
| 0 | 1 | 2 | 3 | 4 | 5 | 6 | 7 | 8 | 9 | 10 | .... |
|---|---|---|---|---|---|---|---|---|---|----|------|
| 0 | 0 | 1 | 0 | 0 | 1 | 0 | 0 | 1 | 1 | 0  | .... |
F I G. 13B
New beacon signal 
F I G. 13C Past search result list L1
Present search result list L2

| .... | | | | | .... |
|---|---|---|---|---|---|
| .... | 1 | 1 | 1 | 1 | .... |

| .... | | | | | .... |
|---|---|---|---|---|---|
| .... | 0 | 0 | 0 | 0 | .... |

Past search result list L1
Present search result list L2

| .... | | | | | .... |
|---|---|---|---|---|---|
| .... | 0 | 0 | 0 | 0 | .... |

| .... | | | | | .... |
|---|---|---|---|---|---|
| .... | 1 | 1 | 1 | 1 | .... |

Past search result list L1 (memory 126b)

| 0 | 1 | 2 | 3 | 4 | 5 | 6 | 7 | 8 | 9 | 10 | .... |
|---|---|---|---|---|---|---|---|---|---|----|------|
| 0 | 0 | 1 | 1 | 1 | 0 | 1 | 0 | 1 | 1 | 0  | .... |

Present search result list L2 (memory 126c)

| 0 | 1 | 2 | 3 | 4 | 5 | 6 | 7 | 8 | 9 | 10 | .... |
|---|---|---|---|---|---|---|---|---|---|----|------|
| 0 | 0 | 1 | 1 | 0 | 0 | 0 | 0 | 1 | 1 | 0  | .... |

New beacon signal

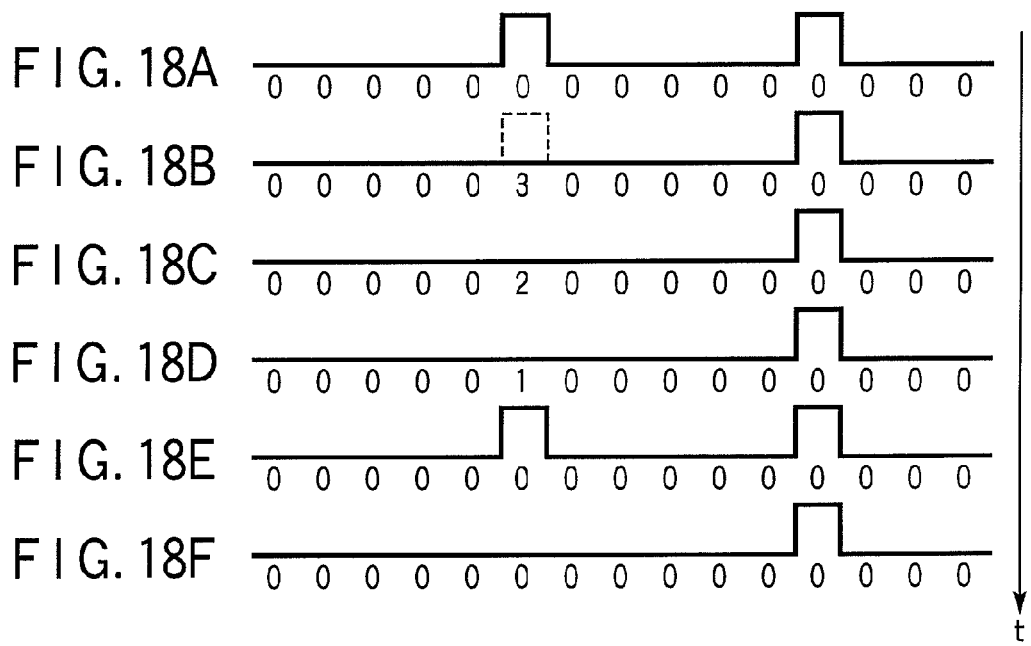
FIG. 18A
FIG. 18B
FIG. 18C
FIG. 18D
FIG. 18E
FIG. 18F
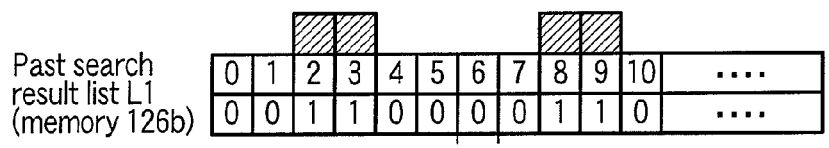
FIG. 19A
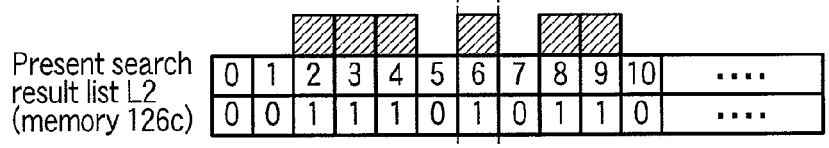
FIG. 19B
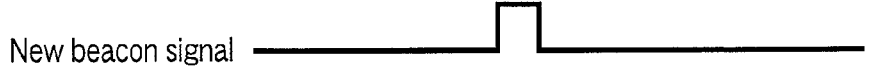
FIG. 19C

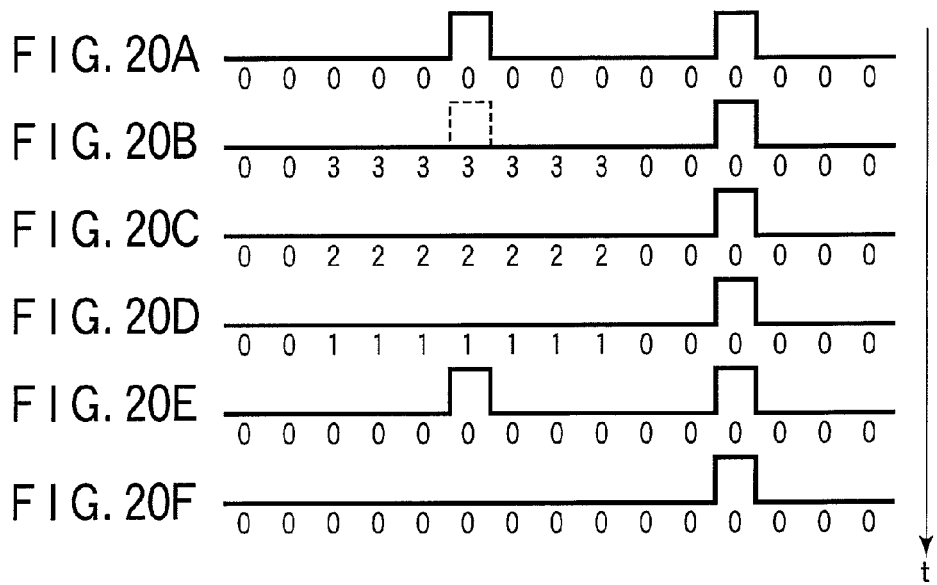

MOBILE WIRELESS TERMINAL DEVICE AND BASE STATION SEARCH METHOD

CROSS-REFERENCE TO RELATED APPLICATIONS

This application is based upon and claims the benefit of priority from prior Japanese Patent Application No. 2010-249147, filed Nov. 5, 2010, the entire contents of which are incorporated herein by reference.

FIELD

Embodiments described herein relate generally to a mobile wireless terminal device and a base station search method configured to carry out wireless communication with a base station accommodated in a network.

BACKGROUND

In recent years, in a mobile wireless communication terminal, a plurality of wireless systems are incorporated. In order to carry out service area detection (hereinafter referred to as area search processing) for each of the plurality of wireless systems, reduction in power consumption of the mobile wireless communication terminal is desired. As a method of reducing power consumption thereof, there is a method of reducing the power consumption by making the search period longer in a stepwise manner when the mobile wireless communication terminal is positioned out of the service area of the base station to lower the frequency of search, because the base station cannot be detected when the mobile wireless communication terminal is positioned out of the service area.

However, there is the problem that by the conventional method in which the search period is made longer, detection of the base station is delayed when the mobile wireless terminal device enters the service area, thereby impairing user convenience in some cases.

In the conventional mobile wireless terminal device, there is the problem that when the period of searching for the base station is made longer in order to reduce the power consumption, detection of an entrance of the device into the service area is delayed, thereby impairing the user convenience in some cases.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing the configuration of a wireless communication system of an embodiment.

FIG. 2 is an exemplary circuit block diagram showing the configuration of a mobile wireless terminal device of the embodiment.

FIG. 6 is an exemplary view for explaining detection processing of a beacon carried out by the low-power-consumption wireless module shown in FIG. 3.

FIG. 7 is an exemplary view for explaining processing for a search window shown in FIG. 5 and FIG. 6.

FIG. 8 is an exemplary view showing the configuration of a memory of FIG. 3.

FIG. 12 is an exemplary flowchart for explaining an operation of the mobile wireless terminal device shown in FIG. 2 at the standby time.

FIGS. 13A, 13B and 13C are exemplary views for explaining processing of block 7f shown in FIG. 12.

FIGS. 18A, 18B, 18C, 18D, 18E and 18F are exemplary views for explaining an example of management of a disappearance beacon using a shadowing follow-up counter memory.

FIGS. 19A, 19B and 19C are exemplary views for explaining determination of a new beacon carried out by the beacon detector shown in FIG. 3.

FIGS. 20A, 20B, 20C, 20D, 20E and 20F are exemplary views for explaining another example of management of a disappearance beacon using a shadowing follow-up counter memory.

FIGS. 21A, 21B, 21C and 21D are exemplary views for explaining determination of a new and/or disappearance beacon at the width variation time of a beacon.

DETAILED DESCRIPTION

Figures 3, 4:
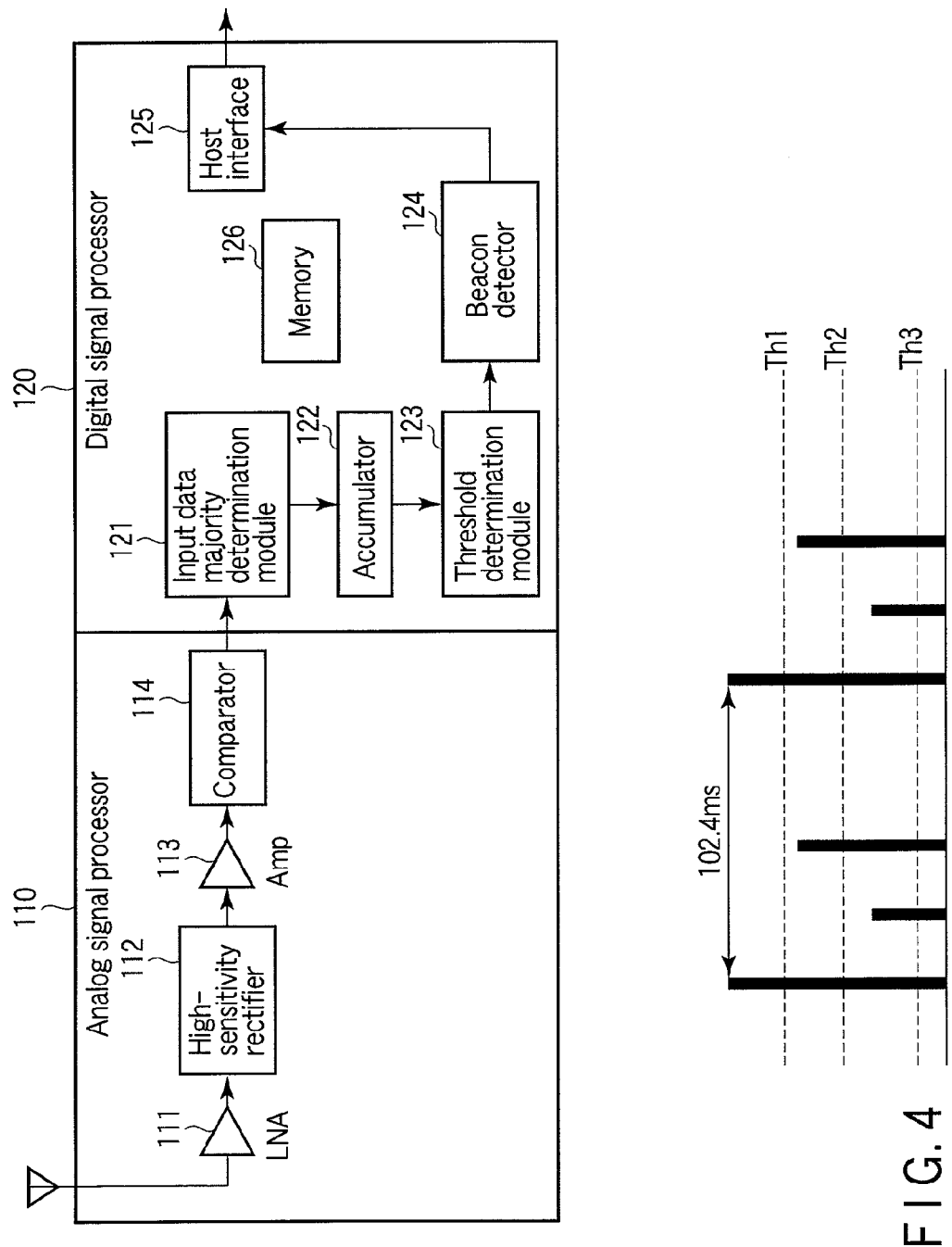
FIG. 3 is an exemplary circuit block diagram showing a configuration example of a low-power-consumption wireless module of the mobile wireless terminal device shown in FIG. 2.
FIG. 4 is an exemplary view for explaining an operation of a comparator of the low-power-consumption wireless module shown in FIG. 3.

Various embodiments will be described hereinafter with reference to the accompanying drawings.

In general, according to one embodiment, a mobile wireless terminal device comprises a receiver configured to detect a beacon transmitted from a base station; and a communication module configured to start operation when the receiver detects the beacon, to receive a wireless signal transmitted from the base station, and to detect identification data of the base station based on a result of decoding a received wireless signal. The receiver comprises an accumulation module configured to accumulate levels of a sampling signal of the received wireless signal for reception timings in a predetermined period in order to obtain a reception profile; a correlation module configured to detect a shift amount which maximizes a correlation between a present reception profile and a past reception profile while shifting the past reception profile in a time axis direction; a first detector configured to detect a beacon, when a difference between the shift amount detected by the correlation module and a default amount is larger than a predetermined amount, in accordance with a difference between a shifted profile obtained by shifting the past reception profile in the time axis direction by the default amount, and the present reception profile; and a second detector configured to detect a beacon, when the difference is not larger than the predetermined amount, in accordance with a difference between a shifted profile obtained by shifting the past reception profile in the time axis direction by the shift amount detected by the correlation module, and the present reception profile.

FIG. 1 shows a system configured to grasp and manage a radio wave of each transmitter even in an environment in which service areas SA of a plurality of transmitters are different from each other. A beacon is transmitted from a base station 12 (transmitter) to a mobile wireless communication terminal 10 with a fixed period in order to perform synchronization/notification data transmission. The mobile wireless communication terminal 10 sets a search window with a fixed interval which is a period of the beacon, and accumulates reception signals with the period. Thus, the terminal 10 can identify the position of the beacon, and grasp and manage a radio wave of each transmitter based on the position.

FIG. 2 shows the configuration of the mobile wireless communication terminal 10 according to the embodiment. This mobile wireless communication terminal 10 has a function of carrying out wireless communication with the base station (wireless LAN access point) accommodated in a network. Thus, the mobile wireless communication terminal 10 includes a low-power-consumption wireless module 100 capable of detecting an area with low power consumption, high-power consumption and high-speed wireless module 200, display 300, input device 400, and main controller 500 (host CPU). Although a following description will be given by taking a case where a wireless LAN is employed as an example of the system of the above-mentioned wireless communication, the wireless communication system is not limited to this.

The low-power-consumption wireless module (eco-chip) 100 is configured to receive a beacon periodically (hereinafter, 102.4 ms is taken as an example) transmitted from the base station 12 to search for the base station, and configured to manage the base station based on a reception profile. The low-power-consumption wireless module 100 has a function of receiving a wireless LAN signal to monitor the reception power level and reception timing of a beacon included in the received wireless LAN signal and, as a result, notifying the main controller 500 that the mobile wireless communication terminal device 10 has entered a service area SA of a new base station.

Further, the low-power-consumption wireless module 100 can autonomously operate even when the main controller 500 does not operate (at a stop or halt), and has a function of starting the main controller 500 in the unoperated state.

A configuration example of the low-power-consumption wireless module 100 is shown in FIG. 3. The low-power-consumption wireless module 100 includes an analog signal processor 110, and digital signal processor 120. The analog signal processor 110 includes a low-noise amplifier (LNA) 111, high-sensitivity rectifier 112, baseband signal amplifier 113, and comparator 114.

The low-noise amplifier 111 amplifies a wireless LAN signal received from a base station, and outputs the amplified signal to the high-sensitivity rectifier 112. It is assumed that the maximum reception sensitivity of a wireless LAN signal transmitted from the base station is sensitivity identical with the wireless module 200. The gain of the low noise amplifier 111 is set in such a manner that the wireless LAN signal matches the high-sensitivity rectifier 112 of the subsequent stage.

The high-sensitivity rectifier 112 does not include a local oscillator of the RF frequency in order to realize low power consumption, but includes, for example, a clocked bias application rectifier. The high-sensitivity rectifier 112 down-converts an output of the low noise amplifier 111 to a baseband signal.

The baseband signal amplifier 113 includes, for example, a current mirror circuit, and current-to-voltage (I-V) converter, and amplifies an output of the high-sensitivity rectifier 112.

In the comparator 114, although a plurality of thresholds Th1, Th2, and Th3 can be set, for example, as shown in FIG. 4, a low threshold, for example, Th3 is set in order to detect beacons from as many base stations as possible. Gains of the low-noise amplifier 111 and baseband signal amplifier 113 are set maximum. The comparator 114 determines a level of an output of the baseband signal amplifier 113 by using the set threshold with a predetermined period. That is, when the output of the baseband signal amplifier 113 exceeds the threshold, a high level signal is output, and when the output does not exceed the threshold, a low level signal (level 0) is output.

In order to carry out beacon management for each base station, the digital signal processor 120 detects reception timing of a signal having a high potential of being a beacon from an output of the comparator 114 based on a beacon transmission period (102.4 ms) of the base station which is the search window. In order to carry out the above processing, the digital signal processor 120 includes an input data majority determination module 121, accumulator 122, threshold determination module 123, beacon detector 124, and memory 126 used by these modules or devices.

More specifically, the accumulator 122 makes a plurality of reception profiles Pa1 to Pa3 each of which has a search window with a search width of 102.4 ms (beacon transmission period of the base station) overlap each other on the time axis to add up wireless LAN signals received at the same timing, thereby obtaining a synthesized profile. Such signal processing functions as a time filter. It is assumed that even when Carrier Sense Multiple Access/Collision Avoidance (CSMA/CA) is carried out, the base station does not change the transmission timing. A beacon transmitted with the same period as the search window appears at the same position, and hence the beacon is added (accumulated). On the other hand, interference waves generated at random are relatively suppressed as compared with the beacon. Further, traffic data having no periodicity, and is generated at a burst has burstiness, and hence there is little possibility of the traffic data existing with the same period as the search window, whereby the traffic data is not cumulatively added unlike the beacon.

As a result, by subjecting the cumulative result to threshold determination, it is possible to detect a beacon based on a position thereof in the search window. In this way, the threshold determination module 123 detects a signal exceeding the threshold Th in the cumulatively added profile (synthesized profile) as a beacon, and outputs the reception timing thereof to the beacon detector 124.

Figure 5:
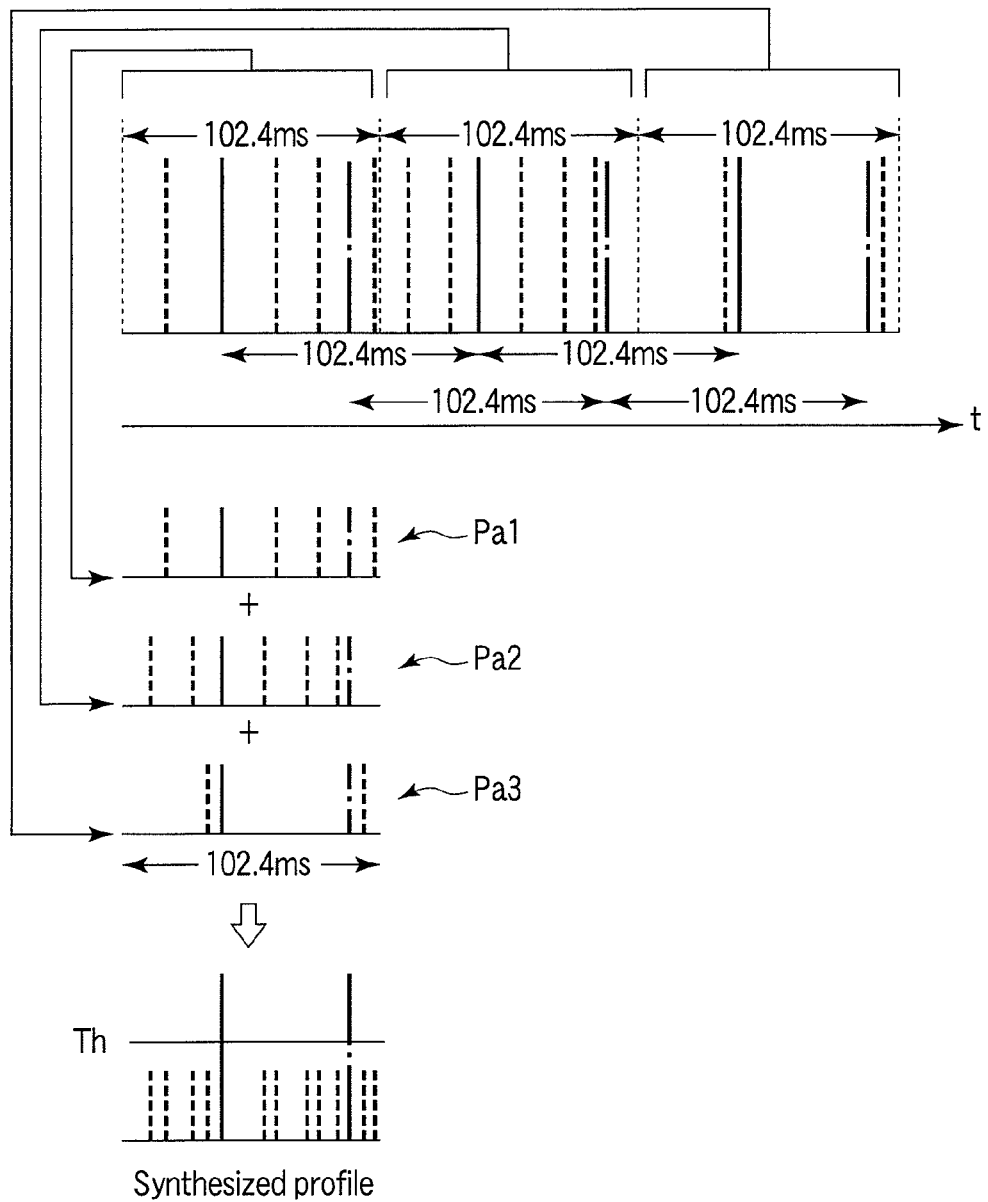
FIG. 5 is an exemplary view for explaining detection processing of a beacon carried out by the low-power-consumption wireless module shown in FIG. 3.

Other than the method of making a beacon conspicuous by adding up a plurality of reception profiles as shown in FIG. 5, there is also a method of making a beacon conspicuous by taking correlations between consecutive search windows as shown in FIG. 6. By obtaining a logical product (substantially accumulating) with respect to the output of the comparator 114 of the same timing of the temporally consecutive reception profiles, it is possible to obtain only a signal in which high signals appear at the same timing, i.e., only a signal having a high potential of being a beacon.

More specifically, a logical product of wireless LAN signals corresponding to each other on the time axis is taken with respect to the reception profile Pb1 and reception profile Pb2, whereby a logical product profile Pb3 is obtained. Further, a logical product of wireless LAN signals corresponding to each other on the time axis is taken with respect to the logical product profile Pb3 and the reception profile Pb4, whereby a synthesized profile is obtained. A wireless LAN signal appearing on the synthesized profile, and greater than the threshold level Th is regarded as a beacon.

The threshold level Th may be controlled by the low-power-consumption wireless module 100 in accordance with the number of samples (cumulatively added number) utilized in the processing of FIG. 5. Further, the threshold level Th may be determined by taking the influence of a shift in the reception timing of the beacon into consideration. That is, in a high-traffic environment in which a shift in the reception timing frequently occurs, the threshold level Th is made small and, in other cases, the threshold level Th is made relatively large.

Hereinafter, the processing shown in FIG. 5 and FIG. 6 will be described more specifically.

As described above, it is assumed that the search window is 102.4 ms, and sampling period is, for example, 200 μs. Then, 512 sampling positions exist in the search window as shown in FIG. 7. As shown in FIG. 8, the memory 126 includes an accumulation memory 126a used for beacon detection by the accumulator 122, a past search result list (L1) memory 126b used for new and/or disappearance beacon detection by the beacon detector 124, present search result list (L2) memory 126c used for new and/or disappearance beacon detection by the beacon detector 124, disappearance time table memory 126d used for position grasp of a disappearance beacon carried out by the beacon detector 124, detection beacon position memory 126e used for new and/or disappearance beacon detection by the beacon detector 124, disappearance beacon position memory 126f used for new and/or disappearance beacon detection by the beacon detector 124, and shadowing follow-up counter memory 126g. The accumulation memory 126a includes 512 storage positions corresponding to the sampling positions. The accumulator 122 cumulatively adds up output results of the comparator 114 in sequence with respect to sampling positions from position P1 to position P512 in the case of FIG. 5, and takes a logical product of the output results of the comparator 114 in the case of FIG. 6, and writes the processing results to storage positions corresponding to the sampling positions of the accumulation memory 126a.

Next, a sampling error will be described below. In general, general-purpose oscillators of the 32.768 kHz clock circulate. It is assumed that the general-purpose oscillator is used as a clock generator of the digital signal processor 120. When the clock frequency is 32.768 kHz (sampling period: approx. 30.5 μs), a large number of, i.e., 3355 (to be exact, 3355.4517 . . . ) sampling positions exist in the search window of 102.4 ms, and a large number of, i.e., 3355 storage positions are required in the accumulation memory 126a.

The majority determination module 121 samples the output of the comparator 114 at a frequency of 32.768 kHz, counts the number of times of high of the k samples, and carries out majority determination for each group of k samples by setting the result at "1" when the number of times of high is a threshold or more, and by setting the result at "0" when the number of times of high is the threshold or less. The determination results are subjected to accumulation processing. Thereby, the majority determination module 121 outputs one determination result in the period corresponding to the k samples, compresses the number of the 3355 samples into 3355/k, and makes the number of storage positions necessary for the accumulation memory 126a 3355/k. FIGS. 9A to 9F show examples in which k=3 and k=7.

Figure 9A:
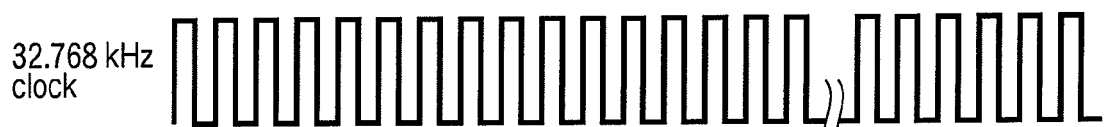
FIGS. 9A, 9B, 9C, 9D, 9E and 9F are exemplary views for explaining majority determination carried out by a majority determination module shown in FIG. 3.
Figure 9B:
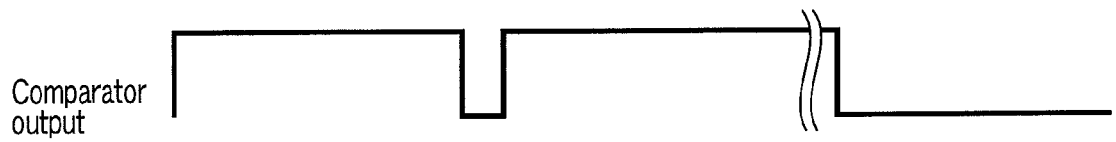
Figure 9C:
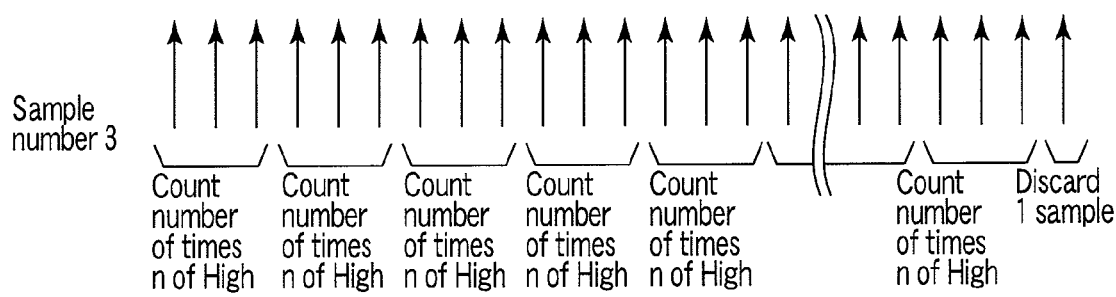
Figure 9D:
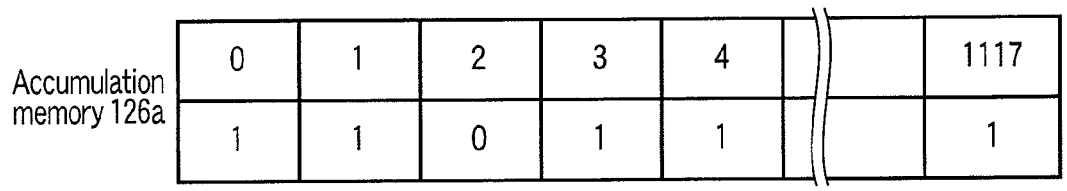
Figure 9E:
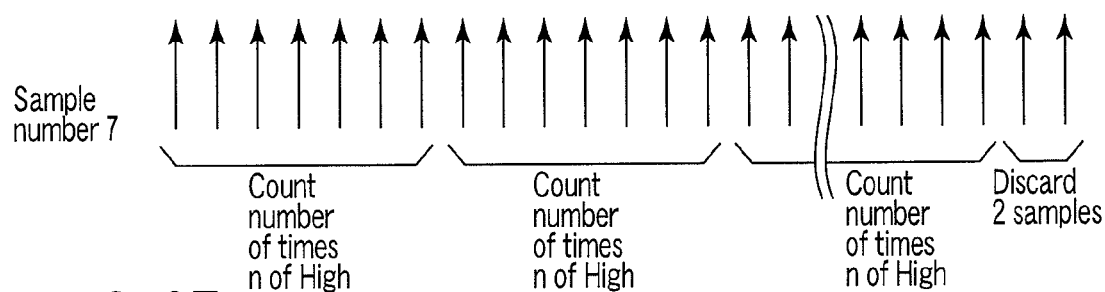
Figure 9F:
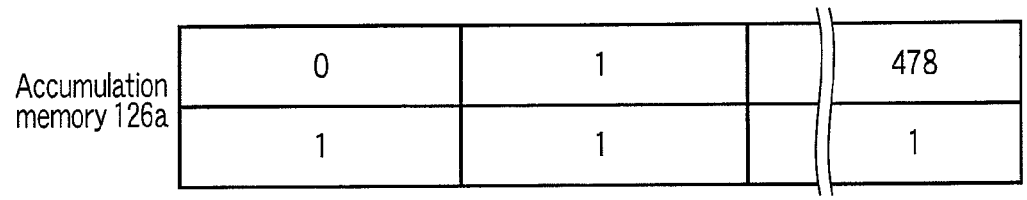

The output (FIG. 9B) of the comparator 114 is sampled at a clock frequency (FIG. 9A) of 32.768 kHz, and the majority determination module 121 carries out majority determination by setting k at 3 (k=3) as shown in for example, FIG. 9C. Then, as shown in FIG. 9D, the number of storage positions necessary for the accumulation memory 126a becomes 1118. Further, when majority determination is carried out by setting k at 7 (k=7) as shown in FIG. 9E, the number of storage positions necessary for the accumulation memory 126a becomes 479 as shown in FIG. 9F. When the clock frequency is 32.768 kHz, the number of positions of the search window of 102.4 ms becomes, to be exact, 3355.4517 . . . , and hence when the number of positions is rounded down to 3355, an odd amount is created in the number of sampling positions, thereby causing a sampling error.

Figures 10, 11A, 11B:
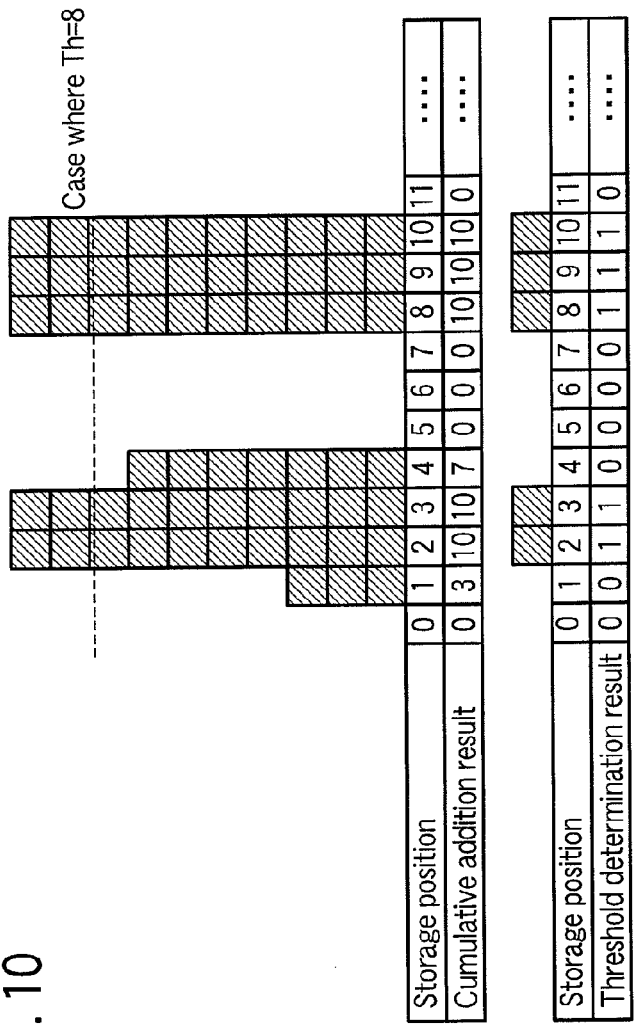
FIG. 10 is an exemplary view for explaining majority determination carried out by the majority determination module shown in FIG. 3.
FIGS. 11A and 11B are exemplary views for explaining threshold determination carried out by a threshold determination module shown in FIG. 3.
Figure 14A:
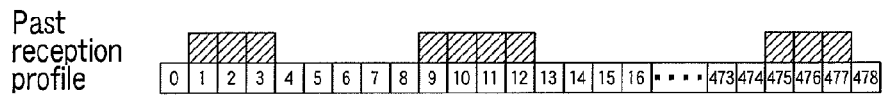
FIGS. 14A, 14B, 14C, 14D, 14E, 14F, 14G, 14H and 14I are exemplary views for explaining security of a clock error carried out by an accumulator shown in FIG. 3.
Figure 14B:
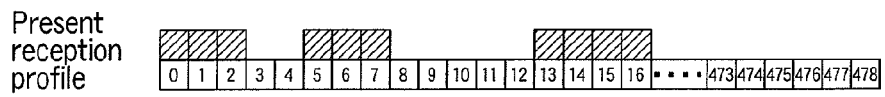
Figure 14C:
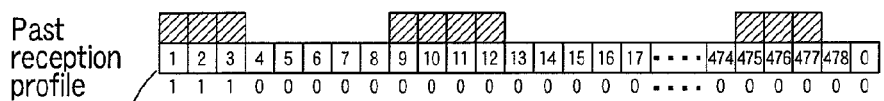
Figure 14D:
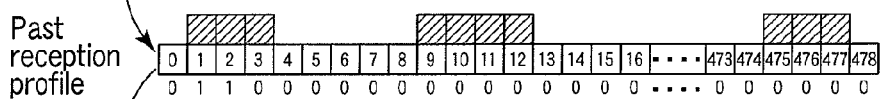
Figure 14E:
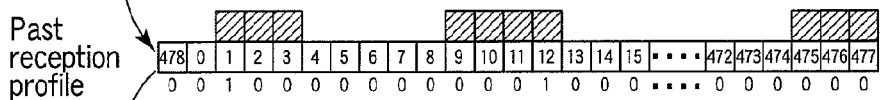
Figure 14F:
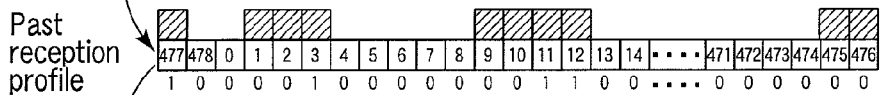
Figure 14G:
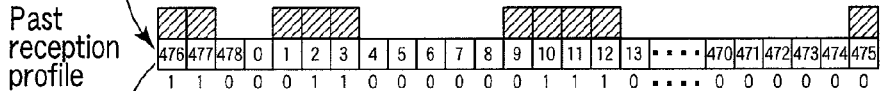
Figure 14H:
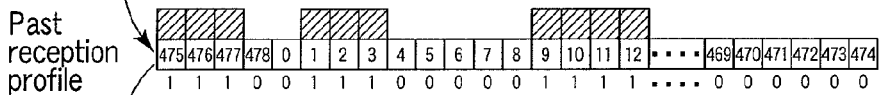
Figure 14I:
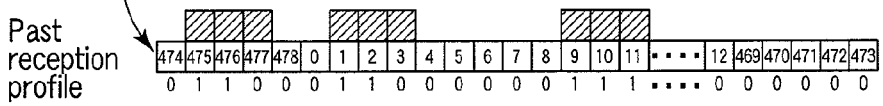

FIG. 10 shows values of k, number of storage positions necessary for the accumulation memory 126a, period (μs) of storing in the accumulation memory 126a, sampling error (μs) for the 102.4 ms period in the case where sampling is carried out at a clock frequency of 32.768 kHz, redundant sample number (rounded-off odd amount) to be discarded at one search window, and sampling error (μs) for the (102.4 ms×10) period in the case where cumulative addition is carried out ten times.

When majority determination is completed for each group of k samples in the 3355 sampling positions of one search window, the majority determination module 121 repetitively carries out the same processing with respect to samples of positions of a search window subsequent to the above search window already processed.

The value of k may be dynamically changed as the need arises. For example, when the reception quality (signal-to-noise ratio) is low, control is carried out to make the value of k larger. Further, by multiplying the sampling frequency (32.768 kHz) by k, the same result as FIG. 10 is obtained.

The accumulator 122 carries out accumulation of the determination results obtained by the majority determination module 121 at the 3355/k storage positions of the accumulation memory 126a. That is, as described previously, in the example shown in, for example, FIG. 5, a synthesized profile is obtained from the profiles Pa1, Pa2, and Pa3, and the obtained profile is written to the accumulation memory 126a. On the other hand, in the example shown in FIG. 6, the accumulator 122 takes a logical product of the profiles Pb1, Pb2, and Pb4 obtained by the majority determination module 121, and writes the synthesized profile to the accumulation memory 126a. The accumulator 122 repeats the accumulation processing only a preset number of times. The accumulated number of times is assumed to be 1 to 31 times, and hence the accumulation memory 126a can store a 5-bit operation result per storage position. The contents of the accumulation memory 126a are initialized before processing is carried out by the accumulator 122 or after processing is carried out by the threshold determination module 123.

The accumulation processing (processing of FIG. 5 or FIG. 6) to be carried out by the accumulator 122 may be carried out after the positional shift of the beacon resulting from a sampling error shown in FIG. 10 and a clock error or the like which is a shift in the clock oscillation frequency of the oscillator itself is corrected (to be described later). Further, in order to prevent the sampling error from being accumulated, the accumulated number of times may be limited to a predetermined number of times. That is, the accumulation memory 126a may be cleared once every predetermined number of accumulations. Thereby, the sampling error is prevented from being accumulated. Furthermore, the power consumption of the low-power-consumption wireless module 100 may be prevented by intermittently carrying out this accumulation processing.

The threshold determination module 123 subjects the result (synthesized profile of FIG. 5 or FIG. 6) obtained by the accumulation processing to threshold determination to detect signals each of which is accumulated to a level greater than or equal to the threshold as beacons, thereby detecting reception timing of each beacon. As shown in FIG. 5, when the cumulative addition system is employed, a determination result "1" is set at a storage position of a present search result list L2 (memory 126c) (FIG. 11B) corresponding to a storage position of data cumulatively added to an amount greater than or equal to a threshold among data items (FIG. 11A) cumulatively added in the accumulation memory 126a. Accordingly, a period (see for example FIGS. 9D and 9F) corresponding to a storage position at which "1" is set in the present search result list L2 (FIG. 11B) can be detected as the beacon reception timing.

The threshold determination module 123 regards, among positions at each of which an accumulation result greater than or equal to the threshold can be obtained, continuous identical positions as the same one beacon. That is, a plurality of continuous identical positions are regarded and detected as reception timing of one beacon.

The beacon detector 124 creates and stores a past search result list L1 and present search result list L2 in the past search result list memory 126b and present search result list memory 126c, respectively. The past search result list L1 is obtained by listing reception timings detected in the past by the beacon detector 124, and present search result list L2 is obtained by listing latest reception timing positions detected by the beacon detector 124. Further, the beacon detector 124 detects that the mobile wireless communication terminal has moved to a service area of a new base station based on the past search result list L1 and present search result list L2.

The beacon detector 124 compensates for the sampling error for the 102.4 ms period shown in FIG. 10, and frequency error (clock error) for each oscillator, and thereafter compares the lists L1 and L2 with each other. Detailed processing will be described later.

A host interface 125 gives an instruction to the main controller 500 based on the detection result of the beacon detector 124. The unoperated main controller 500 is operated to start the wireless module 200.

The wireless module 200 is a so-called WiFi (registered trademark) module configured to search for a connectable base station, and carry out wireless LAN communication with the base station, and an operation thereof is controlled by an instruction from the main controller 500. The wireless module 200 is, in comparison with the low-power-consumption wireless module 100, provided with a function of down-converting a received wireless signal to obtain data, and function of transmitting data (encoding, modulation, and wireless transmission), and power consumption thereof is high.

The display 300 is configured to show visual data such as characters, images, and the like to the user, and includes a display device such as a Liquid Crystal Display (LCD) or the like.

The input device 400 includes an input interface using a plurality of key switches, touch panel, and the like, and receives a request from the user.

The main controller 500 is configured to control all the sections of the mobile wireless terminal device in a unifying manner, and includes a function of supplying power to the low-power-consumption wireless module 100, and wireless module 200, and function of controlling operations of these modules. Even in a state where the main controller 500 itself is unoperated (halt state or pause state), the main controller 500 can supply power to the low-power-consumption wireless module 100 to operate the module 100, and can be started from the unoperated state (halt state or pause state) by the control from the low-power-consumption wireless module 100.

Further, although cooperation of the low-power-consumption wireless module 100 and wireless module 200 is carried out though the main controller 500, it is also possible to impart a function of the main controller 500 to the low-power-consumption wireless module 100 or wireless module 200 so that cooperation the low-power-consumption wireless module 100 and wireless module 200 is carried out without using the main controller 500.

Next, operations of the mobile wireless terminal device configured as described above will be described below. In the following description, particularly, operations from the processing of searching for the base station in the standby state, up to the processing of wireless connection will be described. FIG. 12 is a flowchart for explaining the operations. The flowchart shows processing to be executed by the low-power-consumption wireless module 100, wireless module 200, and main controller 500, and the processing is executed when an instruction from the main controller 500 is received by the low-power-consumption wireless module 100. In the following description, the description will be given by taking a case where the sampling frequency for the comparator 114 is 32.768 kHz as an example.

During the processing shown in FIG. 12, when a connection request is received from the user through the input device 400, the main controller 500 controls the wireless module 200 to detect a service set identifier (SSID) of each of connectable base stations, detects a base station which is available, and is in the best reception state or a base station designated by the user from among the connectable base stations, carries out wireless connection to the detected base station, and starts communication. Such processing is carried out in, for example, block 7p to be described later.

Further, while the low-power-consumption wireless module 100 executes the processing shown in FIG. 12, the main controller 500 shifts to the unoperated state (halt state or pause state) in some cases. For example, when the standby state continues for a fixed time or more without a user operation being not carried out through the input device 400, the low-power-consumption wireless module 100 starts to carry out the above-mentioned processing. On the other hand, the main controller 500 shifts to the unoperated state (halt state or pause state). However, the main controller 500 may monitor a request from the user through the input device 400, and may return from the halt state or pause state to the normal operation state in accordance with the user request.

First, in block 7a, the low-power-consumption wireless module 100 (beacon detector 124) initializes the past search result list L1 (memory 126b), and shifts to block 7b.

In block 7b, the low-power-consumption wireless module 100 (beacon detector 124) initializes the present search result list L2 (memory 126c), and shifts to block 7c.

In block 7c, the low-power-consumption wireless module 100 (analog signal processor 110 and digital signal processor 120) receives a wireless LAN signal transmitted from the base station to search for a base station (beacon) (called eco-chip search), and then shifts to block 7d.

More specifically, the majority determination module 121 samples the output of the comparator 114, carries out majority determination with respect to each group of k samples to thereby carry out level determination in the period. Thereby, results of level determination for the 3355/k positions are obtained, and the results are written to the accumulation memory 126a.

Next, the accumulator 122 carries out the accumulation processing as exemplified in FIG. 5 or FIG. 6. Thereby, results of the accumulation processing are stored at the 3355/k storage positions of the accumulation memory 126a.

Subsequently, the threshold determination module 123 subjects the results (synthesized profile of FIG. 5 or FIG. 6) obtained by the accumulation processing to threshold determination shown in FIGS. 11A and 11B to detect signals each of which is accumulated to an amount greater than or equal to the threshold as beacons, thereby detecting reception timing of each beacon.

The threshold determination module 123 regards, among positions at each of which an accumulation result greater than or equal to the threshold can be obtained, continuous identical positions as the same one beacon. That is, a reception profile in which a plurality of continuous identical positions are regarded as reception timing of one beacon is created.

In block 7d, the low-power-consumption wireless module 100 (beacon detector 124) updates the present search result list L2 (memory 126c) based on the reception profile (synthesized profile of FIG. 5 or FIG. 6) obtained in block 7c, and then shifts to block 7e. Thereby, the present search result list L2 (memory 126c) stores therein the reception timing of a signal indicated by the reception profile (synthesized profile of FIG. 5 or FIG. 6). At this time, in order to reduce the power consumption due to the circuit size, the number of reception beacons may also be stored.

In block 7e, the low-power-consumption wireless module 100 (beacon detector 124) refers to the reception profile (synthesized profile of FIG. 5 or FIG. 6) to determine whether or not a signal seeming to be a beacon exceeding the predetermined threshold level Th exists, thereby determining whether or not the mobile wireless terminal device is positioned in a service area formed by any base station. Here, when it is determined that the mobile wireless terminal device is positioned in the service area, the processing is shifted to block 7f. On the other hand, when it is determined that the mobile wireless terminal device is positioned out of the service area, the processing is shifted to block 7i.

In block 7f, the low-power-consumption wireless module 100 (beacon detector 124) compares the past search result list L1 (memory 126b) and present search result list L2 (memory 126c) with each other to detect a beacon, and then shifts to block 7g. As shown in for example, FIGS. 13A, 13B, and 13C, in the past search result list L1 (memory 126b), and present search result list L2 (memory 126c), beacon detection positions in the search windows, i.e., beacon reception timing points are compared with each other to thereby detect a new beacon. At this time, as described above, not the beacon positions (reception timing points), but the numbers of beacons may be compared.

Figure 15:
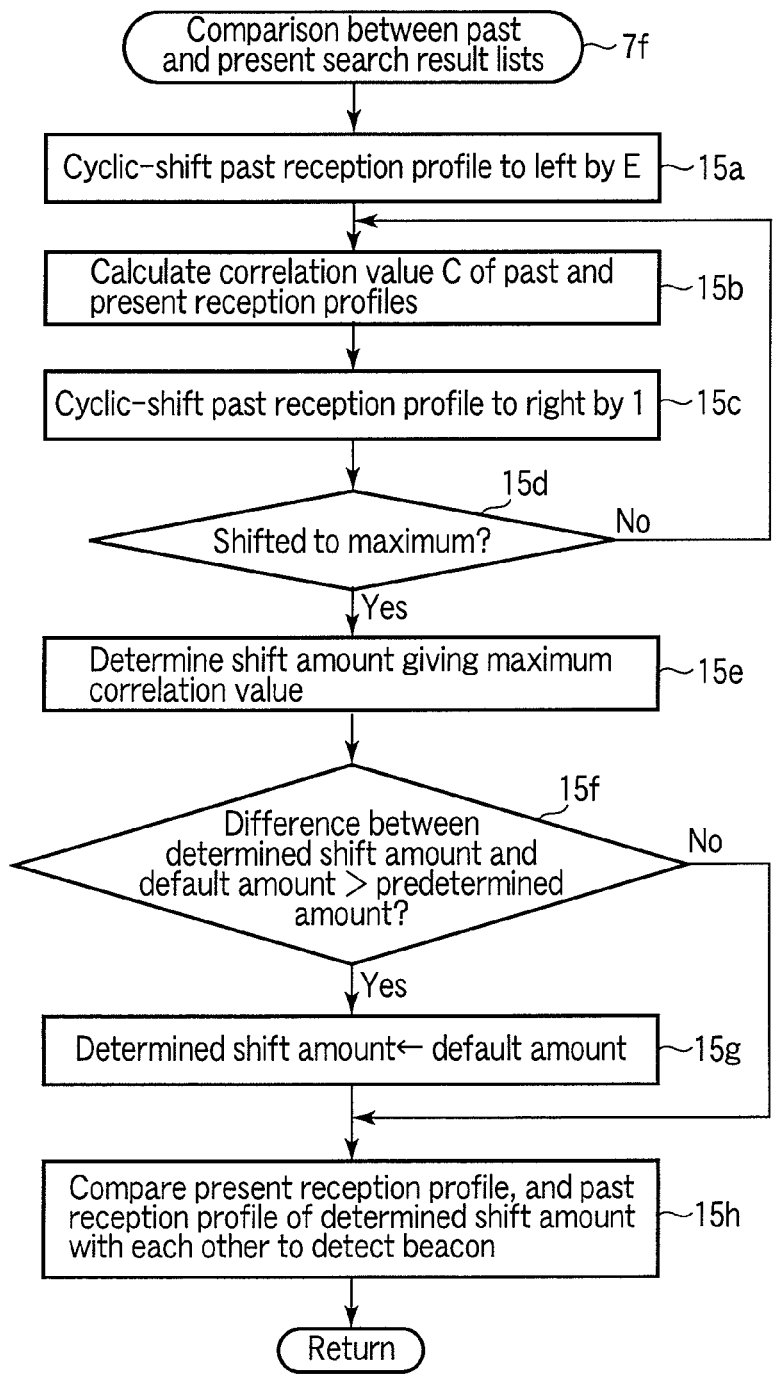
FIG. 15 is an exemplary view showing details of block 7f of the flowchart of FIG. 12.

More specifically, algorithm of the comparison processing carried out by the beacon detector 124 in block 7f will be described. First, the beacon detector 124 compensates for the beacon positional shift based on the sampling error shown in FIG. 10, and clock error, and the like of the oscillator itself. This is because, even with the same beacon, the reception position shifts in some cases based on the sampling error, clock error, and the like of the oscillator itself. Hereinafter, shift compensation of the beacon reception position will be described below with reference to FIGS. 14A to 14I, and FIG. 15. FIGS. 14A to 14I are views showing the shift of the reception profile based on the past search result lists L1, and present search result list L2 stored in the memories 126b and 126c, and FIG. 15 is a flowchart showing the detailed processing of block 7f. In order to compensate for the positional shift, the beacon detector 124 carries out the following processing.

Although the beacon detection position shifts to differ in the present search result list, and past search result list due to the influence of the odd amount of the search window of 102.4 ms, error of the beacon transmission period of each base station, and error of 32.768 kHz of each oscillator, the maximum amount (in each of the advancing direction and returning direction) of the shift can be estimated.

First, the beacon detector 124 shifts (cyclic left shifts) the reception profile (hereinafter referred to as the past reception profile, FIG. 14A) based on the past search result list L1 stored in the memory 126b to a position advanced in reception timing by an amount corresponding to the preestimated maximum error E in the advancing direction (block 15a of FIG. 15), and compares the shifted past reception profile (FIG. 14D), and reception profile (hereinafter referred to as the present reception profile, FIG. 14B) based on the present search result list L2 stored in the memory 126c with each other to obtain the sum total of the logical products of the above past reception profile, and the present reception profile at each storage position as the correlation value $C_1$ (block 15b of FIG. 15). The maximum error E implies a value determined by the maximum error estimated from the frequency error of the oscillator itself of the 32.768 kHz clock, and sampling error for 102.4 ms shown in FIG. 10.

Further, the beacon detector 124 shifts (cyclic right shifts) the past reception profile (FIG. 14C) to a position delayed by an amount of timing T (T=approx. 30 µs×k) corresponding to one storage position (block 15c of FIG. 15), and compares the shifted past reception profile (FIGS. 14D, 14E, 14F, 14G, 14H, and 14I), and present reception profile (FIG. 14B) with each other to repeat the processing of obtaining the correlation values $C_m$ M (=E/T) times, thereby obtaining the correlation values $C_1$ to $C_M$ (repetition of blocks 15d, 15b, and 15c of FIG. 15).

Further, the beacon detector 124 detects the maximum correlation value $C_m$ (block 15e), and compares the past reception profile (here, FIG. 14H) of the shift amount by which the maximum correlation value has been obtained, and present reception profile with each other (block 15h of FIG. 15). In block 15e, when a plurality of shifted past reception profiles each exhibit the maximum correlation value, one of the shifted past reception profiles having the smallest shift amount may be employed. In this manner, the beacon detector 124 obtains the correlation value of the past reception profile, and present reception profile while cyclic shifting the reception timing of the past reception profile, and compares the past reception profile having the highest correlation with the present reception profile among the cyclic shifted past reception profiles, and present reception profile with each other, thereby compensating for the beacon positional shift.

However, when a beacon does not exist or when a very large number of interference waves exist, beacon positional shift correction shown in FIGS. 14A to 14I cannot be carried out or cannot be carried out correctly in some cases. As a result, even error correction of the shadowing countermeasure memory utilized as the shadowing countermeasure to be described later cannot be carried out in some cases. The error mentioned herein implies an error obtained by adding up errors such as the clock error, sampling error, and the like.

Figures 16A, 16B, 17A, 17B, 17C:
FIGS. 16A and 16B are exemplary views showing reception states at the time of beacon disappearance.
FIGS. 17A, 17B and 17C are exemplary views for explaining determination of beacon disappearance carried out by a beacon detector shown in FIG. 3.

A description will be given by taking the case where the environment has changed to an environment in which the beacon is not detected as shown in, for example, FIGS. 16A and 16B as an example. As shown in FIG. 16A, when there are beacons of four storage positions in the past search result list L1 and, as a result of the present search, beacons are not detected at all, if the positional shift correction algorithm of FIGS. 14A to 14I is applied, the sum total of all the logical products for the cyclic shift becomes zero. Likewise, as shown in FIG. 16B, when beacons do not exist in the past search result list L1 at all and, as a result of the present search, beacons of four storage positions are detected too, the sum total of all the logical products for the cyclic shift becomes zero. In the algorithm of FIGS. 14A to 14I, among the shift amounts that maximize the sum total of the logical products, the minimum shift amount is employed as the correction amount of the past reception profile, and hence it is determined that the correction amount is zero.

In this case, in a shadowing countermeasure section, although a memory thereof is updated to 1 or more, correction for beacon reception positional shift is not carried out for the memory, and hence there is the possibility of even the same beacon being detected as another beacon.

Thus, for the case where no beacon exists, and case where no comparison object exists, a default amount of the shift amount is defined. A difference (absolute value) between the shift amount determined in the processing of FIGS. 14A and 14I and default amount is obtained (block 15f of FIG. 15). When the difference is greater than or equal to a certain threshold, beacon positional shift compensation is carried out by utilizing the default amount without using the shift amount determined in the processing of FIGS. 14A and 14I (block 15g of FIG. 15). For example, assuming that the default amount is 5, and the threshold is 3, when the shift amount determined by the algorithm of FIG. 14 is 2 or less or 9 or more, not the determined shift amount, but the default amount is used for correction. In the case of FIG. 16A or 16B too, even when the shift amount is made zero, the past reception profile is shifted by the default amount of 5, and the shifted past reception profile is compared with the present reception profile.

Thereby, for example, when the beacon disappears, and the sum total of all the logical products for the cyclic shift becomes zero, it becomes possible to carry out positional shift correction by using the default value as the error correction amount, and it also becomes possible for the shadowing countermeasure section to follow the beacon. Here, it is assumed that the default amount of the error correction amount can be given by a method of substituting a statistically obtained value or by following a change in the error mount.

Next, beacon detection processing will be specifically described below. The detection processing includes disappearance beacon detection processing P1 of detecting a disappearance beacon, and new beacon detection processing P2 of detecting a new beacon.

(Disappearance Beacon Detection Processing P1)

The algorithm of the disappearance beacon detection processing P1 will be described below with reference to FIGS. 17A to 17C. FIG. 17A is a view showing reception timing of a beacon based on the past search result list L1, and FIG. 17B is a view showing reception timing of a beacon based on the present search result list L2.

The beacon detector 124 compares both lists L1 and L2 (FIGS. 17A and 17B) with each other, and detects that beacons disappear at the storage position "4", and storage position "6". However, the beacon at the storage position "4" is adjacent to the beacon at the storage position "3", and hence there is the possibility of the beacon at the storage position "4" being temporarily detected at the timing of FIG. 17A or having temporarily disappeared at the timing of FIG. 17B due to fluctuation, whereby the beacon at the storage position "4" is not regarded as having disappeared. On the other hand, there exists no beacon adjacent to the beacon at the storage position "6", and hence the beacon at the storage position "6" is detected as a disappearance beacon (FIG. 17C).

In order to eliminate a temporarily detected beacon, and beacon having the possibility of its having temporarily disappeared from beacon detection, the beacon detector 124 carries out management in such a manner that a count value N is given to a storage position of the shadowing follow-up counter memory 126g corresponding to a position at which a beacon disappears (hereinafter referred to as a disappearance position) and, thereafter during a predetermined time, even when a new beacon occurs, the occurrence is not regarded as occurrence of a new beacon.

More specifically, in block 7f, the beacon detector 124 sets the count value N at a disappearance position. FIGS. 18A to 18F show an example of the state where the contents of the shadowing follow-up counter memory 126g make a transition. Each of the waveforms of FIGS. 18A to 18F shows the reception state (corresponding to the determination result of the present search result list L2), and numerals under each of the waveforms show contents of the shadowing follow-up counter memory 126g.

When the reception state makes a transition from the reception state shown in FIG. 18A to the reception state shown in FIG. 18B, the beacon detector 124 sets a count value N (3 in this example) at a storage position of the shadowing follow-up counter memory 126g corresponding to the disappearance position. It is assumed that a count value zero is set in advance at each of storage positions.

Further, in block 7f, regarding the storage positions of the shadowing follow-up counter memory 126g at each of which a count value N of 1 or more is already set as shown in FIG. 18B, 18C or 18D, the beacon detector 124 decrements each of the count values N.

In block 7f, by carrying out the above management, the count value N is given to the disappearance position, and thereafter, until the processing of block 7f is carried out the predetermined number N of times (until the predetermined time elapses), a state where a count value of 1 or more is set at a storage position of the shadowing follow-up counter memory 126g corresponding to the disappearance position, i.e., a "marked state" is given. That is, when a storage position is once treated as a disappearance position, the storage position continues to be regarded as the disappearance position for a predetermined time. During the time, even when the present search result list indicates "1", detection of a new beacon is not carried out, and a disappearance beacon is prevented from being detected at the storage position "4" of FIG. 17B.

When a new beacon occurs before countdown to zero of the count value N is effected (before the predetermined time elapses), the count value N may be set again. That is, the storage position further continues to be regarded as the disappearance position for the predetermined time.

(New Beacon Detection Processing P2)

The algorithm of the new beacon detection processing P2 will be described below with reference to FIGS. 19A to 19C.

FIG. 19A is a view showing reception timing based on the past search result list L1, and FIG. 19B is a view showing reception timing based on the present search result list L2.

The beacon detector 124 compares both lists L1 and L2 (FIGS. 19A and 19B) with each other, and detects existence of new beacons at the storage position "4", and storage position "6" (FIG. 19C). However, the beacon at the storage position "4" is adjacent to the beacon at the storage position "3", and hence there is the possibility of the beacon at the storage position "4" having temporarily disappeared at the timing of FIG. 19A or being temporarily detected at the timing of FIG. 19B due to fluctuation, whereby the beacon at the storage position "4" is not regarded as a new beacon. On the other hand, there exists no beacon adjacent to the beacon at the storage position "6", and hence the beacon at the storage position "6" is detected as a new beacon.

Further, the beacon detector 124 confirms that a count value N of 1 or more is not set at a storage position of the shadowing follow-up counter memory 126g corresponding to the position of the new beacon unlike FIGS. 18B, 18C, and 18D (not within a predetermined time from the time at which the position is regarded as a disappearance position). When a count value N of 1 or more is set (marked as a disappearance position), it is determined that an unstable new beacon has been detected, and the detection of a new beacon is canceled.

On the other hand, when the count value N(=0) is set at a storage position of the shadowing follow-up counter memory 126g corresponding to the position of the new beacon, the beacon detector 124 determines that a stable new beacon has been detected.

In the above description, it is assumed that transmission timing of a beacon is constant, though CSMA/CA is employed. The case where the beacon transmission timing is changed by CSMA/CA will be described below. When the beacon transmission timing is shifted from the predetermined timing by CSMA/CA, in the comparison of the search result lists in block 7f of FIG. 12, even with the same beacon, the reception timing is shifted. Accordingly, the same beacon is detected at a position different from the position at which the beacon has been detected by the scanning of the last time in some cases. Thereby, there is the possibility of the beacon being erroneously detected as a new beacon.

In order to prevent the above inconvenience, when a disappearance position is marked in the shadowing follow-up counter memory 126g shown in FIGS. 18A to 18F, the beacon detector 124 gives a count value N to each of storage positions of the shadowing follow-up counter memory 126g corresponding to several positions before and after the disappearance position. FIGS. 20A to 20F show the case where a count value N is given to each of the storage positions of the shadowing follow-up counter memory 126g corresponding to three positions before and after the disappearance position.

Thereby, when the beacon transmission timing is changed by CSMA/CA, it is possible to eliminate the possibility of a beacon detected at a position somewhat different from a position at which the beacon has been detected by the scanning of the last time from being regarded as the same beacon, and being erroneously detected as a new beacon. According to this method, even when a beacon has disappeared, thereafter the transmission timing is changed by CSMA/CA, and the disappearance beacon is detected again, it becomes possible to appropriately cope with the situation. The count value N, and the number of positions (also called a margin) to be extended before and after the disappearance position are made parameters, and are adjustable.

Next, a countermeasure against the beacon positional shift due to other reasons will be described. In the above-mentioned accumulation system, the period of a beacon which is the object to be detected is made the criterion, and hence when a plurality of base stations exist, beacon reception timing differs between the base stations in some cases due to differences in clock error amount between base stations, shifts in beacon transmission timing resulting from CSMA/CA, and variations in notification data amount contained in the beacon. Regarding the shift amount, although design in which a time corresponding to one storage position of the accumulation memory 126a is taken into consideration is carried out, a shift in reception timing of the beacon greater or equal to the time corresponding to two storage positions occurs in some cases in the actual environment due the reasons described above. Accordingly, there is the possibility of an error being caused in the detection of a new beacon, detection of a disappearance beacon or start-up determination of the wireless module 200.

Thus, when the past search result list L1 and present search result list L2 are compared with each other, if even part of the reception timing of lists L1 overlaps that of L2 as shown in FIGS. 21A to 21D, the beacon detector 124 regards the beacons of the partially overlapping timing as the same beacon, and does not carry out new/disappearance beacon detection. Thereby, even when variation in length occurs in the beacon reception period, it becomes possible to follow the same beacon correctly, and reduce erroneous detection and undetected beacons.

Returning to the flowchart of FIG. 12, the low-power-consumption wireless module 100 (beacon detector 124) determines in block 7g whether or not a change has occurred in the service area based on the comparison result of block 7f. That is, it is determined whether or not disappearance of a beacon has been detected or whether or not a new beacon has been detected. At this time, as described above, it may also be determined whether or not the numbers of beacons coincide with each other.

Here, when disappearance of a beacon is detected or when a new beacon is detected, and it is determined that a change has occurred in the service area, the processing shifts to block 7h. On the other hand, when it is determined that no change has occurred in the service area (when reception timing coincidence or beacon number coincidence is obtained), the processing shifts to block 7c.

In block 7h, when a new beacon has been detected (or when the number of beacons has increased) in the comparison of block 7f, the low-power-consumption wireless module 100 (beacon detector 124) determines that the device has moved to a new service area, and shifts to block 7j. On the other hand, when no new beacon has been detected, the module 100 determines that there is no movement of the device to a new service area, and shifts to block 7i.

In block 7i, the low-power-consumption wireless module 100 (beacon detector 124) updates the past search result list L1 based on the present search result list L2, and shifts to block 7c. Thereby, the past search result list L1 stores therein the reception timing of the signal indicated by the reception profile (synthesized profile of FIG. 5 or FIG. 6) of the present search result list L2.

In block 7j, the low-power-consumption wireless module 100 (beacon detector 124) updates the past search result list L1 based on the present search result list L2, and shifts to block 7k. Thereby, the past search result list L1 stores therein the reception timing of the signal indicated by the reception profile (synthesized profile of FIG. 5 or FIG. 6) of the present search result list L2. Here, the beacon detector 124 provides notification to the host interface 125.

In block 7k, the low-power-consumption wireless module 100 (host interface 125) notifies the main controller 500 to start the wireless module 200, and shifts to block 7l. Thereby, the main controller 500 stops supply of power to the low-power-consumption wireless module 100 to stop the operation of the low-power-consumption wireless module 100, and starts supplying power to the wireless module 200 to start the module 200.

In the case where the main controller 500 is in the unoperated state (halt state or pause state), when the main controller 500 receives the above notification, the main controller 500 is brought into the operating state, stops the low-power-consumption wireless module 100 in response to the above notification (stop of power supply), and starts the wireless module 200 instead. The low-power-consumption wireless module 100 may also be configured to stop the operation thereof by itself without by means of the main controller 500 when it starts the wireless module 200.

In block 7l, the wireless module 200 receives beacons transmitted from the base stations, decodes the beacons, and detects a service set identifier (SSID), i.e., identification data of the base station included in each of the beacons. Thereby, base stations positioned around the mobile wireless terminal device are detected, the detection results are notified to the main controller 500, and the processing is shifted to block 7m.

In block 7m, the main controller 500 determines whether or not an available base station (e.g., a base station providing subscription services) exists in the surrounding area based on the SSID notified from the wireless module 200. Here, when an available base station exists in the surrounding area, the processing is shifted to block 7n. On the other hand, when no available base station exists in the surrounding area, the processing is shifted to block 7o.

In block 7n, the main controller 500 displays the SSID of the base station for which it is determined in block 7m that the base station is available, and carries out display asking the user whether connection to the base station of this SSID is permitted. Further, the main controller 500 determines whether or not the input indicating that the connection is permitted has been carried out by the user through the input device 400. Here, when the input from the user indicating that the connection is permitted is detected, the processing is shifted to block 7p. When the input from the user indicating that the connection is permitted is not detected, the processing is shifted to block 7o. Further, automatic connection may also be carried out by user setting.

In block 7o, the main controller 500 stops power supply to the wireless module 200 to stop the operation of the wireless module 200, starts supplying power to the low-power-consumption wireless module 100 instead to start the module 100, and shifts to block 7c.

When the processing is shifted to block 7o, the base station is a base station for which it is determined that the base station is not available or a base station to which connection is not permitted by the user. Hence, in block 7o, the main controller 500 retains the SSID of the base station for a preset time and, when the processing of block 7m is executed again within the above preset time, it may also be determined in block 7m based on the stored SSID that the base station is unavailable. Further, in order that the wireless module 200 may not be started again by the same base station which is unavailable, the past search result list L1 is updated in block 7j.

Furthermore, the main controller 500 detects the reception timing of the stored SSID based on the cumulative addition result of the reception profiles obtained by the low-power-consumption wireless module 100, and SSID received by the wireless module 200, and notifies the low-power-consumption wireless module 100 of the reception timing. Further, in later block 7c, the low-power-consumption wireless module 100 may not carry out search for the timing of the predetermined period including the reception timing of the notification from the main controller 500. Thereby, it is possible to prevent an unnecessary search period taken by the low-power-consumption wireless module 100, and achieve further progress toward the lower power consumption.

In block 7p, the main controller 500 controls the wireless module 200 to instruct it to connect the device to the available base station. In response to this instruction, the wireless module 200 carries out wireless communication with the available base station in accordance with a predetermined protocol, establishes a communication link, and terminates the processing.

As described above, in the mobile wireless terminal device of the embodiment, the reception profile (reception timing) of a beacon is monitored by using the low-power-consumption wireless module 100 which does not provide a function of decoding a reception signal and is lower in power consumption than the wireless module 200. When the reception timing of the beacon changes, it is determined that the device has moved to a new service area, the wireless module 200 which has been kept unoperated is started to search for a connectable base station. After confirmation is carried out by the user, connection to the base station is carried out. Further, when a connectable base station is not found (out of subscription service range) or when the user refuses connection, the operation of the wireless module 200 is stopped again.

Therefore, according to the mobile wireless terminal device according to the embodiment, at the standby time, the low-power-consumption wireless module 100 lower in power consumption than the wireless module 200 is operated. Hence it is possible to reduce the power consumption concomitant with the search for a base station, but continuously search for a change in the service area (returning home, movement from home, movement to the inside of a hot spot, and the like), thereby making it possible to prevent the user's convenience from lowering.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. The novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above description, although the beacon transmission period (102.4 ms) is used as a search window, and the overall search window is searched, part of the search window may be searched. For example, the comparator 114 and beacon detector 124 are configured not to carry out processing with respect to timing for which the beacon cannot be received for more than a preset time based on the accumulation result of the accumulator 122 or the determination result of the threshold determination module 123 or are configured to carry out processing only with respect to timing in a predetermined range including timing for which the beacon can be received for more than a preset time. Thereby, the time for reception processing can be shortened, and hence the power consumption can be reduced.

The above-mentioned range is determined by taking the maximum amount of the error resulting from the cumulative addition into consideration. Further, regarding such reduction in search period, after carrying out the search period reduction for a predetermined time, the processing may be returned to the processing of searching the overall search window. By periodically returning the processing to the processing of searching the overall search window, it is possible, even when the user moves to a new service area, to detect the movement.

Further, in the above embodiments, although the description has been given on the assumption that the low-power-consumption wireless module 100 stores the past search result list L1 and present search result list L2, and compares the storage contents of the past search result list L1 and storage contents of the present search result list L2, the main controller 500 may carry out the above processing.

What is claimed is:

1. A mobile wireless terminal device configured to wirelessly communicate with a base station accommodated in a network, the device comprising:
    a receiver configured to receive a wireless signal transmitted by the base station, to frequency-convert the received wireless signal to obtain a reception signal, and to detect a beacon transmitted by the base station based on the reception signal obtained by frequency conversion; and
    a communication module configured to start in accordance with detection of the beacon by the receiver, to decode the reception signal, to acquire identification information of the base station, and to communicate with the base station,
    wherein the receiver comprises:
        an accumulation module configured to accumulate reception levels of a sampling signal of the reception signal for reception timings over a predetermined period to obtain a reception profile;
        a correlation module configured to detect a shift amount which maximizes a correlation between a present reception profile obtained by the accumulation module and a past reception profile obtained by the accumulation module while shifting the past reception profile over time axis;
        a first detector configured to detect the beacon, when a difference between the shift amount detected by the correlation module and a default amount is larger than a predetermined amount, in accordance with a difference between a shifted profile obtained by shifting the past reception profile over the time axis by the default amount and the present reception profile; and
        a second detector configured to detect the beacon, when the difference is not larger than the predetermined amount, in accordance with a difference between a shifted profile obtained by shifting the past reception profile over the time axis by the shift amount and the present reception profile.

2. The device of claim 1, wherein the accumulation module is further configured to determine the reception levels of the sampling signal based on majority determination.

3. The device of claim 1, wherein the first detector and the second detector are further configured not to detect the beacon during a first predetermined time from a reception timing of a disappearance beacon even if there is a difference between the shifted profile and the present reception profile at the reception timing of the disappearance beacon and at predetermined number of reception timings before and after the reception timing of the disappearance beacon.

4. The device of claim 3, wherein the first detector and the second detector are further configured not to detect the beacon during a second predetermined time from a reception timing of a new beacon which is detected at the reception timing of the disappearance beacon and at the predetermined number of reception timings before and after the reception timing of the disappearance beacon even if there is a difference between the shifted profile and the present reception profile at the reception timing of the disappearance beacon and at predetermined number of reception timings before and after the reception timing of the disappearance beacon.

5. The device of claim 1, further comprising a controller configured to stop operation of the receiver when the communication module is operated.

6. The device of claim 1, wherein the first detector and the second detector are further configured not to detect the beacon when a beacon detected based on the shifted profile and a beacon detected based on the present reception profile overlap each other at least one of the reception timings even if there is a difference between the shifted profile and the present reception profile.

7. A base station search method for a mobile wireless terminal device configured to wirelessly communicate with a base station accommodated in a network, the method comprising:
    controlling a receiver configured to receive a wireless signal transmitted by the base station, and detecting a beacon transmitted by the base station based on a reception signal obtained from the wireless signal; and
    starting a communication module configured to wirelessly communicate with the base station in accordance with a reception result of the beacon, decoding the reception signal, acquiring identification information of the base station, and communicating with the base station, wherein
    the controlling and detecting comprises:
        accumulating reception levels of a sampling signal of the reception signal for reception timings over a predetermined period in order to obtain a reception profile;
        detecting a shift amount which maximizes a correlation between a present reception profile obtained by the accumulating and a past reception profile obtained by the accumulating while shifting the past reception profile over a time axis;
        detecting the beacon, when a difference between the detected shift amount and a default amount is larger than a predetermined amount, by comparing a shifted profile obtained by shifting the past reception profile over the time axis by the default amount with the present reception profile; and
        detecting the beacon, when the difference is not larger than the predetermined amount, by comparing a shifted profile obtained by shifting the past reception profile over the time axis by the detected shift amount with the present reception profile.

8. The method of claim 7, wherein accumulating the reception levels of the sampling signal comprises determining the reception levels based on majority determination.

9. The method of claim 7, wherein the beacon is not detected during a first predetermined time from a reception timing of a disappearance beacon even if there is a difference between the shifted profile and the present reception profile at the reception timing of the disappearance beacon and at predetermined number of reception timings before and after the reception timing of the disappearance beacon.

10. The method of claim 9, wherein the beacon is not detected during a second predetermined time from a reception timing of a new beacon which is detected at the reception timing of the disappearance beacon and at the predetermined number of reception timings before and after the reception timing of the disappearance beacon even if there is a difference between the shifted profile and the present reception profile at the reception timing of the disappearance beacon and at predetermined number of reception timings before and after the reception timing of the disappearance beacon.

11. The method of claim 7, wherein the beacon is not detected when a beacon detected based on the shifted profile and a beacon detected based on the present reception profile overlap each other at least one of the reception timings even if there is a difference between the shifted profile and the present reception profile.

* * * * *